US011573482B2

(12) United States Patent
Zhang

(10) Patent No.: US 11,573,482 B2
(45) Date of Patent: Feb. 7, 2023

(54) SMALL ADJUSTABLE PROJECTION DEVICE BASED ON SECONDARY REFLECTION

(71) Applicant: Luxnpro Chengdu Electronics Co., Ltd, Chengdu (CN)

(72) Inventor: Jin Zhang, Chengdu (CN)

(73) Assignee: Luxnpro Chengdu Electronics Co., Ltd, Chengdu (CN)

( * ) Notice: Subject to any disclaimer, the term of this patent is extended or adjusted under 35 U.S.C. 154(b) by 20 days.

(21) Appl. No.: 16/796,870

(22) Filed: Feb. 20, 2020

(65) Prior Publication Data

US 2021/0263397 A1 Aug. 26, 2021

(51) Int. Cl.

*G03B 21/14* (2006.01)
*G03B 21/28* (2006.01)

(52) U.S. Cl.

CPC ........... *G03B 21/142* (2013.01); *G03B 21/28* (2013.01)

(58) Field of Classification Search

CPC ...... G03B 21/00–64; H04N 9/31–3197; G02B 27/01–0189; G02B 2027/0105–0198

See application file for complete search history.

(56) References Cited

U.S. PATENT DOCUMENTS

| | | | | |
|---|---|---|---|---|
| 5,758,940 A * | 6/1998 | Ogino | G03B 21/14 | 348/E9.027 |
| 2010/0073636 A1* | 3/2010 | Sasaki | G02B 30/26 | 353/13 |
| 2014/0320382 A1* | 10/2014 | Moussa | G02B 27/0149 | 345/7 |
| 2018/0031833 A1* | 2/2018 | Ogasawara | G02B 27/0149 | |
| 2018/0172991 A1* | 6/2018 | Iwashita | G02B 27/0101 | |

FOREIGN PATENT DOCUMENTS

CN 206773384 U 12/2017

* cited by examiner

*Primary Examiner* — Bao-Luan Q Le
*Assistant Examiner* — Christopher A Lamb, II

(57) ABSTRACT

The projection device includes a projector housing, wherein a light source mechanism is provided on a right side of an internal bottom end of the projector housing, a lens set is arranged on a right side of the projector housing, two guide slots are vertically arranged on an inner wall on a left side of the projector housing, a lifting support is arranged on the two guide slots, the lifting support is fitted to the two guide slots via a lifting device, a first reflector is obliquely arranged on the lifting support, a second reflector is fixedly and obliquely arranged under the lifting support, and a direction of an inclination of the second reflector is opposite to a direction of an inclination of the first reflector.

4 Claims, 2 Drawing Sheets

SMALL ADJUSTABLE PROJECTION DEVICE BASED ON SECONDARY REFLECTION

TECHNICAL FIELD

The present invention relates to the technical field of optical projection devices, and in particular to a small adjustable projection device based on secondary reflection.

BACKGROUND

A projector, also known as a projection machine, is an apparatus which can project an image or a video onto a curtain, and can be connected to a computer, a VCD, a DVD, a BD, a game console, a DV, etc. via different interfaces to play respective video signals. LCD projectors are one type of projector. The LCD projectors have the advantages of good color reproduction, high resolution, small size and light weight, are also convenient to carry, and are a mainstream product in the current projector market.

At present, a projection device based on the single-chip LCD technology generally comprises a light source component (such as a light source and a reflection cup), an incident light guide component (generally a convex lens, a condensing lens, a reflection cup, a light cone, an incident Fresnel lens, etc.), an LCD screen, an emergent Fresnel lens, and a lens set. For some of the projection machines, a mirror forming an angle of 45 degrees with the center of an optical axis is arranged in a horizontal direction between the emergent Fresnel lens and the lens set. However, according to the design of optics and optical path of such a projection device, the change in optical path is only implemented in one horizontal plane, and thus the projection device has a single form and simple functions.

The invention with the application No. CN 201720481960.3 discloses an optical path structure of a projector, and it can be seen from to the disclosed structure that, according to this patent, two reflectors are additionally provided outside the projector to change the travel path of light, so that there is a difference in height in a vertical direction between the projection position of light and the position of a light source so as to implement the change in the vertical direction of the optical path and extend the travel distance of light at the same time, thereby sufficiently projecting a clear image in a limited space. However, the reflectors thereof are fixedly arranged outside the projector, such that the optical path and the optical distance thereof are fixed, which limits the use thereof in some different environments and limits the function thereof to adjust the projected image. Moreover, the reflectors fixedly arranged outside occupy a large space and cannot move flexibly. In essence, it is only an auxiliary close-range amplification device that is arranged outside an existing projection machine, with the fundamental purpose of amplifying a projected image in a relatively narrow space.

SUMMARY

An object of the present invention is to solve the problem in the patent mentioned above that the reflectors are fixedly arranged to lead in fixed optical path and optical distance such that it is difficult to be applied in different environments and is difficult to adjust a projected image, especially to solve the problem of how to use a mirror with a small area inside the projector to change the physical form of the projector and the overall structure stacking so as to change and adjust the optical distance and optical path of projection. The present invention provides a small adjustable projection device based on secondary reflection.

In order to achieve the object mentioned above, the following technical solutions are specifically used in the present invention:

a small adjustable projection device based on secondary reflection, comprising a projector housing provided with a light source mechanism on a right side of an internal bottom end thereof, wherein a lens set is arranged on a right side of the projector housing, two guide slots are vertically arranged on an inner wall of a left side of the projector housing, a lifting support is arranged on the guide slots, the lifting support is fitted to the guide slots via a lifting device, a reflector a with an adjustable angle is obliquely arranged on the lifting support, and a reflector b is fixedly and obliquely arranged below the lifting support.

Further, the lifting support comprises semicircular support frames corresponding to the guide slots on both sides on a one-to-one basis, a semicircular slide slot is arranged at an arc edge of the semicircular support frame, a semicircular rack is arranged at an inner ring of the semicircular slide slot, a connecting rod b and a connecting rod a are respectively arranged in a vertical manner between the semicircular support frames on both sides, upper and lower ends of the reflector a are respectively fixed to the connecting rod b and the connecting rod a, two ends of the connecting rod a are hinged to the center of the semicircular support frame, one end of the connecting rod a is connected to a rotating motor used for adjusting the angle of inclination of the reflector a, the connecting rod b passes through the semicircular slide slots on both sides, and gears cooperating with the semicircular rack are sheathed on two ends of the connecting rod b.

Further, the lifting device comprises a lead screw vertically arranged inside the guide slot, a slide block is sheathed on the lead screw in the guide slot, the slide block is connected to the semicircular support frame in the lifting support via a joint lever, and a bottom end of the lead screw is connected to a lifting motor.

Further, the light source mechanism comprises a light source; and a light guide body, an incident Fresnel lens, an LED (light-emitting diode) screen and an emergent Fresnel lens are sequentially arranged, from right to left, on a left side of the light source.

Further, a right side of the projector housing is provided with a second lens set between the two guide slots, and both front and back sides of the reflector a are mirror sides capable of reflecting light.

The beneficial effects of the invention are as follows.

1. The lifting support can drive the reflector a to move up and down so as to adjust the distance between the reflector a and the reflector b, achieving adjustment of the optical distance, such that the size of a projected image and the projection quality can be adjusted by controlling the optical distance, and at the same time, the optical path can be changed by adjusting the angle of inclination of the reflector a so as to adjust an imaging angle, thereby solving the imaging problems such as a trapezoidal phenomenon. In addition, the reflector a and the reflector b are integrated into the projector, which greatly decreases the volume of the whole secondary projection device, decreases the occupied space, and enables the whole device to move flexibly and applied in different sites.

2. Using the lifting support can not only adjust the height of the reflector a, but also adjust the angle of inclination of the reflector a, thus achieving the adjustment of the optical distance by adjusting the distance between the reflector a and the reflector b so as to adjust the projected image, and also achieving any adjustment of the angle of inclination of the reflector a in the range between 0° and 180°. In this way, the adjustment of optical path is achieved, certain imaging problems caused by the optical path are solved, and projection requirements for different sites are satisfied at the same time.

3. The lead screw and slide block lifting mechanism has a simple structure, stable functions, long service life and high displacement precision, and can precisely adjust the projection imaging.

4. When the angle of inclination of the reflector a is adjusted to be in the same direction of inclination as the reflector b, the light emitted from the light source mechanism can be reflected to the left side of the projector housing via the reflector a and the reflector b, and the projection imaging is performed via the second lens set on the left side, thereby achieving projection imaging on both sides of the projector without moving the projector to satisfy the projection requirements in different directions.

Figure 1:
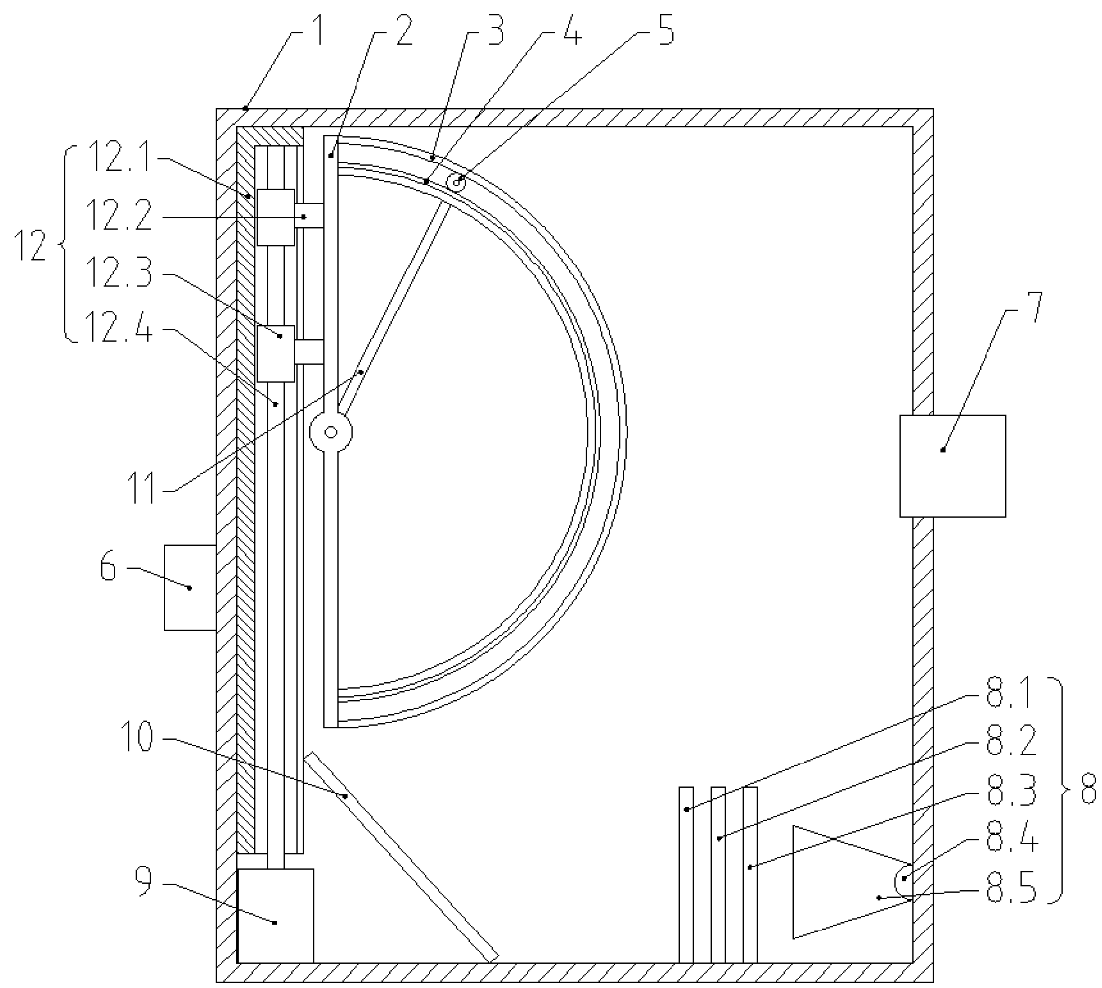
FIG. 1 is a structural schematic view of the present invention.
Figure 2:
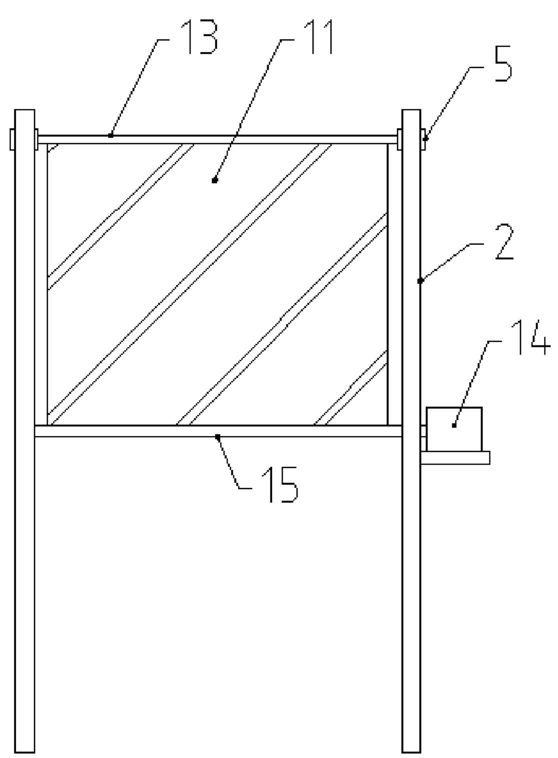
FIG. 2 is a partial right view of a semicircular support frame in FIG. 1.

Reference signs in the drawings: 1. Projector housing, 2. Semicircular support frame, 3. Semicircular slide slot, 4. Semicircular rack, 5. Gear, 6. Second lens set, 7. Lens set, 8. Light source mechanism, 8.1. Emergent Fresnel lens, 8.2. LCD screen, 8.3. Incident Fresnel lens, 8.4. Light source, 8.5. Light guide body, 9. Lifting motor, 10. Reflector b, 11. Reflector a, 12. Lifting device, 12.1. Guide slot, 12.2. Joint lever, 12.3. Slide block, 12.4. Lead screw, 13. Connecting rod b, 14. Rotating motor, and 15. Connecting rod a.

DETAILED DESCRIPTION OF THE EMBODIMENTS

In order to enable those skilled in the art to better understand the present invention, the present invention will be further described in detail below in conjunction with the accompanying drawings and following embodiments.

Embodiment 1

A small adjustable projection device based on secondary reflection, comprising a projector housing 1 provided with a light source mechanism 8 on a right side of an internal bottom end thereof, wherein a lens set 7 is arranged on a right side of the projector housing 1, two guide slots 12.1 are vertically arranged on an inner wall of a left side of the projector housing 1, a lifting support is arranged on the guide slots 12.1, the lifting support is fitted to the guide slots 12.1 via a lifting device 12, a reflector a 11 with an adjustable angle is obliquely arranged on the lifting support, a reflector b 10 is fixedly and obliquely arranged below the lifting support, and the light source 8.4 mechanism 8, the reflector b 10, the reflector a 11 and the lens set 7 are sequentially arranged along an optical path.

Operation principle: the light source mechanism 8, the reflector b 10, the reflector a 11 and the lens set 7 are sequentially arranged along the optical path, light is emitted from the light source mechanism 8, the light is reflected for the first time via the reflector b 10 to reflect the light above the reflector b 10, and the light is reflected for a second time by the reflector a 11 above the reflector b 10 to reflect the light to a right side of the reflector a 11, so that imaging is performed with the light via the lens set 7, and at the same time, the optical distance and optical path of the light can be adjusted by adjusting the distance and the angle between the reflector a 11 and the reflector b 10 by means of the lifting support.

The lifting support can drive the reflector a to move up and down so as to adjust the distance between the reflector a and the reflector b, achieving adjustment of the optical distance, such that the size of a projected image and the projection quality can be adjusted by controlling the optical distance, and at the same time, the optical path can be changed by adjusting the angle of inclination of the reflector a so as to adjust an imaging angle, thereby solving the imaging problems such as a trapezoidal phenomenon. In addition, the reflector a and the reflector b are integrated into the projector, which greatly decreases the volume of the whole secondary projection device, decreases the occupied space, and enables the whole device to move flexibly and applied in different sites.

Embodiment 2

This embodiment is an improvement on the basis of embodiment 1:

the lifting support comprises semicircular support frames 2 corresponding to the guide slots 12.1 on both sides on a one-to-one basis, a semicircular slide slot 3 is arranged at an arc edge of the semicircular support frame 2, a semicircular rack 4 is arranged at an inner ring of the semicircular slide slot 3, a connecting rod b 13 and a connecting rod a 15 are respectively arranged in a vertical manner between the semicircular support frames 2 on both sides, upper and lower ends of the reflector a are respectively fixed to the connecting rod b 13 and the connecting rod a 15, two ends of the connecting rod a 15 are hinged to the center of the semicircular support frame 2, one end of the connecting rod a 15 is connected to a rotating motor 14 used for adjusting the angle of inclination of the reflector a 11, the connecting rod b 13 passes through the semicircular slide slots 3 on both sides, and gears 5 cooperating with the semicircular rack 4 are sheathed on two ends of the connecting rod b 13.

The above improvement is advantageous in that using the lifting support can not only adjust the height of the reflector a, but also adjust the angle of inclination of the reflector a, thus achieving the adjustment of the optical distance by adjusting the distance between the reflector a and the reflector b so as to adjust the projected image, and also achieving any adjustment of the angle of inclination of the reflector a in the range between 0° and 180°. In this way, the adjustment of optical path is achieved, certain imaging problems caused by the optical path are solved, and projection requirements for different sites are satisfied at the same time.

Embodiment 3

This embodiment is an improvement on the basis of above embodiments:

the lifting device 12 comprises a lead screw 12.4 vertically arranged inside the guide slot 12.1, a slide block 12.3 is sheathed on the lead screw 12.4 in the guide slot 12.1, the slide block 12.3 is connected to the semicircular support frame 2 in the lifting support via a joint lever 12.2, and a bottom end of the lead screw 12.4 is connected to a lifting motor 9.

The above improvement is advantageous in that the lead screw and slide block lifting mechanism has a simple structure, stable functions, long service life and high displacement precision, and can precisely adjust the projection imaging.

Embodiment 4

This embodiment is an improvement on the basis of above embodiments:

the light source mechanism 8 comprises a light source 8.4; and a light guide body 8.5, an incident Fresnel lens 8.3, an LED screen 8.2 and an emergent Fresnel lens 8.1 are sequentially arranged, from right to left, on a left side of the light source 8.4.

Embodiment 5

This embodiment is an improvement on the basis of above embodiments:

the left side of the projector housing 1 is provided with a second lens set 6 between the two guide slots 12.1, and both front and back sides of the reflector a 11 mirror sides capable of reflecting light.

The above improvement is advantageous in that when the angle of inclination of the reflector a is adjusted to be in the same direction of inclination as the reflector b, the light emitted from the light source mechanism can be reflected to the left side of the projector housing via the reflector a and the reflector b, and the projection imaging is performed via the second lens set on the left side, thereby achieving projection imaging on both sides of the projector without moving the projector to satisfy the projection requirements in different directions.

The above embodiments are merely preferred embodiments of the present invention but not intended to limit the present invention, the scope of patent protection of the present invention shall be determined by the claims, and for the same reasoning, all the equivalent structural changes made by using the description and accompanying drawings of the present invention shall be included within the scope of protection of the present invention.

What is claimed is:

1. A small adjustable projection device based on a secondary reflection, comprising a projector housing, wherein a light source mechanism is provided on a right side of an internal bottom end of the projector housing, a first lens set is arranged on a right side of the projector housing, a first guide slot and a second guide slot are vertically arranged on an inner wall of a left side of the projector housing, a lifting support is arranged on the first guide slot and the second guide slot, the lifting support is fitted to the first guide slot and the second guide slot via a lifting device, a first reflector with an adjustable angle is obliquely arranged on the lifting support, and a second reflector is fixedly and obliquely arranged under the lifting support;

the lifting support comprises a first semicircular support frame and a second semicircular support frame, the first semicircular support frame corresponds the first guide slot on a first side, the second semicircular support frame corresponds the second guide slot on a second side, a semicircular slide slot is arranged at an arc edge of each semicircular support frame of the first semicircular support frame and the second semicircular support frame, a semicircular rack is arranged at an inner ring of the semicircular slide slot, a first connecting rod and a second connecting rod are arranged in a vertical manner between the first semicircular support frame on the first side and the second semicircular support frame on the second side, respectively, an upper end of the first reflector is fixed to the first connecting rod, a lower end of the first reflector is fixed to the second connecting rod, a first end of the second connecting rod is hinged to a center of the first semicircular support frame, a second end of the second connecting rod is hinged to a center of the second semicircular support frame, the first end of the second connecting rod is connected to a rotating motor configured to adjust the adjustable angle of an inclination of the first reflector, the first connecting rod passes through the first semicircular slide slot and the second semicircular slide slot, and gears cooperating with the semicircular rack are sheathed on two ends of the first connecting rod.

2. The small adjustable projection device based on the secondary reflection according to claim 1, wherein the lifting device comprises a lead screw vertically arranged inside each guide slot of the first guide slot and the second guide slot, a slide block is sheathed on the lead screw in the each guide slot, the slide block is connected to each semicircular support frame of the first semicircular support frame and the second semicircular support frame in the lifting support via a joint lever, and a bottom end of the lead screw is connected to a lifting motor.

3. The small adjustable projection device based on the secondary reflection according to claim 1, wherein the light source mechanism comprises a light source; and a light guide body, an incident Fresnel lens, an LED screen and an emergent Fresnel lens are sequentially arranged, from right to left, on a left side of the light source.

4. The small adjustable projection device based on the secondary reflection according to claim 1, wherein the left side of the projector housing is provided with a second lens set between the first guide slot and the second guide slot, and both front and back sides of the first reflector are mirror sides configured to reflect light.

* * * * *